US012585527B2

(12) United States Patent
McLaren et al.

(10) Patent No.: US 12,585,527 B2
(45) Date of Patent: Mar. 24, 2026

(54) DIAGNOSTICS USING A DIAGNOSTIC ENGINE CORE AND DIAGNOSTIC MODULES

(71) Applicant: HEWLETT PACKARD ENTERPRISE DEVELOPMENT LP, Spring, TX (US)

(72) Inventors: Stuart Alexander McLaren, Galway (IE); Ryan Charles Davis, Galway (IE); Zoey Simone, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 9 days.

(21) Appl. No.: 18/738,202

(22) Filed: Jun. 10, 2024

(65) Prior Publication Data

US 2025/0377966 A1     Dec. 11, 2025

(51) Int. Cl.
| | |
|---|---|
| *G06F 11/00* | (2006.01) |
| *G06F 11/07* | (2006.01) |
| *G06F 11/36* | (2025.01) |

(52) U.S. Cl.
CPC ............ *G06F 11/079* (2013.01); *G06F 11/07* (2013.01); *G06F 11/36* (2013.01)

(58) Field of Classification Search
CPC ......... G06F 11/079; G06F 11/36; G06F 11/07
See application file for complete search history.

(56) References Cited

U.S. PATENT DOCUMENTS

| | | | |
|---|---|---|---|
| 8,448,170 B2 | 5/2013 | Wipfel et al. | |
| 9,703,553 B2 * | 7/2017 | Bates | G06F 8/71 |
| 11,675,584 B1 * | 6/2023 | Sengupta | G06F 8/75 |
| | | | 717/124 |
| 2023/0026283 A1 * | 1/2023 | Xu | H04L 41/0654 |
| 2023/0281098 A1 * | 9/2023 | Hesse | G06F 11/3058 |
| | | | 726/22 |
| 2023/0421459 A1 | 12/2023 | Foukas et al. | |
| 2024/0143433 A1 * | 5/2024 | Verma | G06F 11/079 |
| 2025/0061040 A1 * | 2/2025 | Pai | H04L 67/30 |

OTHER PUBLICATIONS

Stallman, "Table of Contents," The C Preprocessor (Year: 1992).*
Stallman, "The C Preprocessor," The C Preprocessor (Year: 1992).*

(Continued)

*Primary Examiner* — Bryce P Bonzo
*Assistant Examiner* — Gabriella Kanani Shelton
(74) *Attorney, Agent, or Firm* — Trop, Pruner & Hu, P.C.

(57) ABSTRACT

In some examples, a diagnostic engine core accesses configuration information specifying diagnostics to be performed on a collection of compute elements. Based on the configuration information, the diagnostic engine core selects diagnostic modules from a plurality of diagnostic modules, and generates a representation of a relationship of the selected diagnostic modules. The diagnostic engine core loads the selected diagnostic modules at runtime of the diagnostic engine core. After the loading, the diagnostic engine core triggers execution of the selected diagnostic modules in an execution order and according to to dependencies specified in the representation of the relationship, the selected diagnostic modules when executed performing the diagnostics on the collection of compute elements.

20 Claims, 5 Drawing Sheets

(56) References Cited

OTHER PUBLICATIONS

Sheldon, "Garbage Collection (GC)" (Year: 2022).*

Wikipedia, "Garbage Collection (Computer Science)" (Year: 2022).*

Smith et al., âWhat is Garbage Collection in Programming and/or Computer Science?â (Year: 2012).*

Scuediero et al., âSeparate Compilation and Linking of CUDA C++ Device Codeâ (Year: 2014).*

"What is Fluentd?", available online at <https://www.fluentd.org/architecture>, 2024, 9 pages.

Atlassian, Incident management for high-velocity teams downloaded Apr. 19, 2024 (5 pages).

Condron et al., Health checks in asp.net Core, Jan. 11, 2024 (15 pages).

Dynatrace, Unified observability and security downloaded Apr. 30, 2024 (9 pages).

Forsgren et al., The Science of Lean Software and Devops Accelerate Building and Scaling High Performing Technology Organizations downloaded Apr. 19, 2024 (29 pages).

Kuzmichev, Sergey, Adding eBPF-Based Metrics to Percona Monitoring and Management, Jul. 6, 2020 (9 pages).

Nagios, The Open Source Standard in Monitoring downloaded Apr. 30, 2024 (6 pages).

Tang, Y., "kubernetes-sidecar-diagnostics", Feb. 8, 2018, 4 pages.

Thurgood et al., Google SRE Book, Chapter 2—Implementing SLOs, 2018 (27 pages).

Torvalds-Linux downloaded Apr. 19, 2024 (7 pages).

Wikipedia, Composability downloaded Apr. 19, 2024 (1 page).

Wikipedia, Service level indicator downloaded Apr. 19, 2024 (1 page).

Wu et al., MicroDiag: Fine-grained Performance Diagnosis for Microservice Systems, 2021 (6 pages).

* cited by examiner

300

Memory

104

Diagnostic
Engine Core

300

Memory

104
Diagnostic
Engine
Core

302

116
Observer
Module

304A

118A
Alert
Module

304B

118B
Alert
Module

700

Memory

702

Diagnostic Engine Core Loading Instructions

704

Configuration Information Access Instructions

706

Dynamic Loading Instructions

708

Diagnostic Modules Relationship Generation Instructions

710

Diagnostic Modules Invocation Instructions

712

Diagnostic Information Sending Instructions

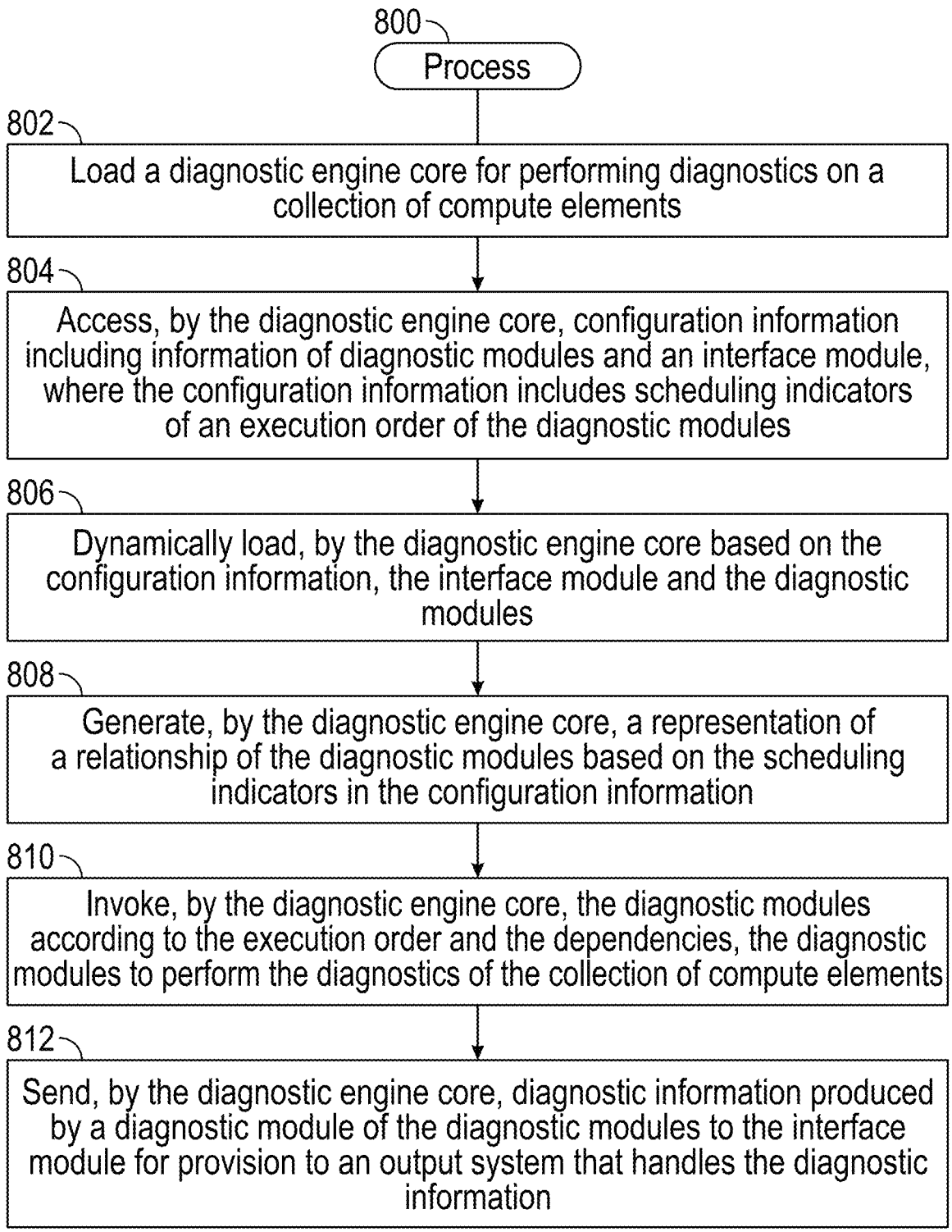

800 ─╮
Process

802 ─╮
Load a diagnostic engine core for performing diagnostics on a collection of compute elements 804 ─╮
Access, by the diagnostic engine core, configuration information including information of diagnostic modules and an interface module, where the configuration information includes scheduling indicators of an execution order of the diagnostic modules 806 ─╮
Dynamically load, by the diagnostic engine core based on the configuration information, the interface module and the diagnostic modules 808 ─╮
Generate, by the diagnostic engine core, a representation of a relationship of the diagnostic modules based on the scheduling indicators in the configuration information 810 ─╮
Invoke, by the diagnostic engine core, the diagnostic modules according to the execution order and the dependencies, the diagnostic modules to perform the diagnostics of the collection of compute elements 812 ─╮
Send, by the diagnostic engine core, diagnostic information produced by a diagnostic module of the diagnostic modules to the interface module for provision to an output system that handles the diagnostic information

FIG. 8

DIAGNOSTICS USING A DIAGNOSTIC ENGINE CORE AND DIAGNOSTIC MODULES

BACKGROUND

A computing environment includes various computing resources and services. Examples of computing resources include processing resources, storage resources, communication resources, and other physical resources that can be used to perform tasks. Examples of computing services include web services, application services, management services, microservices, or other types of services.

BRIEF DESCRIPTION OF THE DRAWINGS

Some implementations of the present disclosure are described with respect to the following figures.

FIG. 8 is a flow diagram of a process according to some examples.

Figure 1:
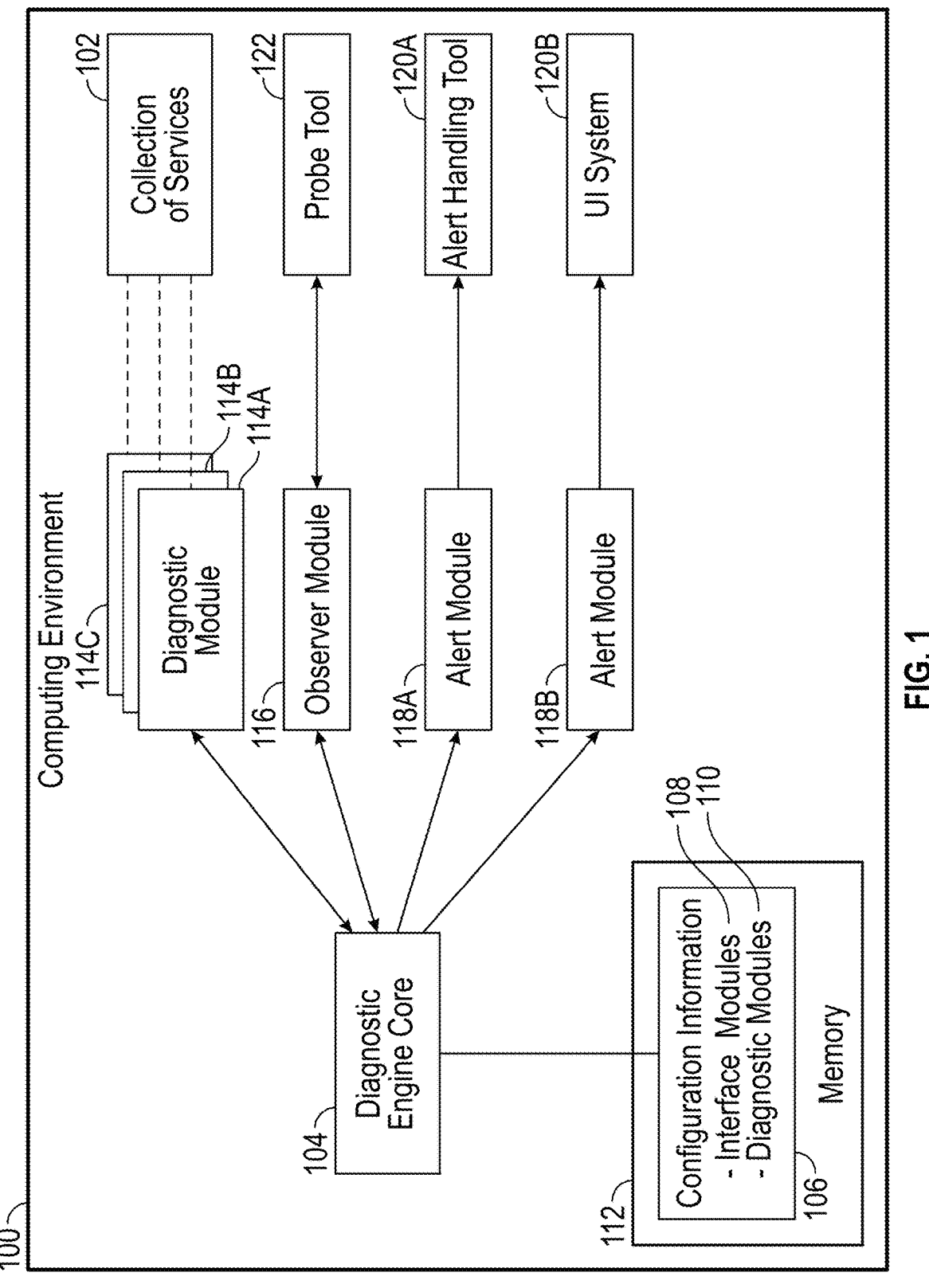
FIG. 1 is a block diagram of an arrangement that includes a diagnostic engine core, diagnostic modules, and interface modules, and output systems to handle diagnostic information, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing resources and services in a computing environment may experience faults. A "fault" can refer to any condition in which a computing resource or service is unable to perform a target task or to achieve a specified goal, such as due to a data error, a failure of a program, a failure of a physical resource, or any other reason. A fault in the computing environment may disrupt performance of workloads by the computing environment. Diagnostic systems may be deployed to detect faults and to initiate remediation actions to address faults in the computing environment. However, diagnostic systems may be expensive to develop, may lack flexibility, and may consume significant resources in performing diagnostics in the computing environment. For example, an organization may seek to develop a diagnostic system that is able to address as many faults as possible. However, developing such a diagnostic system may take a long time and may be costly in terms of personnel. Additionally, if a development team does not have the requisite expertise or knowledge, the developed diagnostic system may not adequately address some faults in the computing environment.

Moreover, building a diagnostic system to address as many faults as possible means that the program code (including machine-readable instructions) of the diagnostic system can be quite large and thus unwieldy. In addition, if new faults are discovered and the program code of the diagnostic system has to be changed to address the new faults, the new program code of the diagnostic system would have to be re-compiled, which can be time consuming and resource intensive. In addition, a large diagnostic system can consume a significant amount of resources (such as processing resources and memory resources) during execution of the diagnostic system, which leads to increased operational costs.

In accordance with some implementations of the present disclosure, a flexible and composable diagnostic system is provided to perform diagnostics in a computing environment, where the composable diagnostic system includes a lightweight diagnostic engine core and extensible modules that can be dynamically loaded and unloaded by the diagnostic engine core. The extensible modules include diagnostic modules to perform respective diagnostics, and interface modules that allow diagnostic information produced by the diagnostic modules to be provided to respective output systems, such as alert handling tools, analysis tools, probe tools, user interface (UI) systems, or other systems for processing, storing, or displaying results of the diagnostics performed by the diagnostic modules. The diagnostic engine core uses configuration information (e.g., in a configuration file or another type of configuration object) to identify which extensible modules of a (possibly large) collection of extensible modules are to be loaded for use as part of diagnostics in the computing environment. The diagnostics may be requested by an entity (e.g., a user, a team of users, an organization, a program, a machine, or any other entity).

The extensible modules identified by the configuration information are referred to as "selected extensible modules." The diagnostic engine core can dynamically load the selected extensible modules, which include selected interface modules and selected diagnostic modules to perform corresponding diagnostics when the selected diagnostic modules are executed. The configuration information can include relationship information specifying a relationship of the selected diagnostic modules, where the relationship includes an execution order of the selected diagnostic modules, as well as dependencies among diagnostic modules. For example, the relationship information may specify that a given diagnostic module depends on outputs produced by one or more other diagnostic modules. The diagnostic engine core parses the configuration information to generate a representation of a diagnostic modules relationship of the selected diagnostic modules, and after loading the selected diagnostic modules, the diagnostic engine core triggers execution of the selected diagnostic modules in the execution order and according to the dependencies specified in the representation of the diagnostic modules relationship.

The diagnostic system according to some examples of the present disclosure can be used in computing environments in which the presence of some faults may be acceptable, provided that the faults do not lead to critical failures or lead to significant performance degradation. Eliminating all faults may not be feasible, since the goal of achieving zero faults can come at a high cost, in terms of monetary cost (due to expending resources to eliminate all faults) and opportunity cost (due to reduction in deliverables provided by the computing environment in seeking to achieve a zero-fault goal). Some faults may have reduced impact or may be of short duration, while other faults may lead to significant downtime or errors. An "error budget" may be allocated to the computing environment that specifies that a certain amount (e.g., a certain quantity or rate) and/or types of faults may be acceptable, e.g., does not violate specified guidelines or rules or agreements.

The diagnostic system according to some examples of the present disclosure is able detect and provide notifications of faults in a timely manner so that the faults can be processed relatively quickly to determine the nature of the faults and how quickly the faults have to be addressed, such as to provide fault isolation, apply remediation actions to fix the faults, or other actions. In some cases, the diagnostic system allows an operator of the computing environment to stay within the error budget while maximizing the delivery of computing services or resources to customers.

A "diagnostic" performed by a diagnostic module can refer to any analysis of a target entity, such as a physical machine, one or more physical resources in the physical machine, a service, a virtual entity such as a virtual machine (VM) or a container, or any other type of entity. Examples of analyses that can be performed on a target entity can include any or some combination of the following: testing of the target entity to detect if any faults are present when the target entity executes and/or to determine a performance level of the target entity, process information of the target entity to detect if the information has been modified or if any error is present in the information, malware scanning to detect presence of malware, or other analysis that can obtain measures relating to operations of the target entity.

FIG. 1 is a block diagram of a computing environment 100 in which one or more services can run. Examples of the computing environments 100 can include any or some combination of the following: a cloud computing environment, a data center, or any other type of environment in which computing services or resources are accessible for use by others (e.g., customers or tenants). In the example of FIG. 1, a collection of services 102 can be executed in the computing environment 100. As used here, a "collection" of items can refer to a single item or multiple items. Thus, the collection of services 102 can include a single service or multiple services.

A "service" can refer to any collection of processes (e.g., a single process or multiple processes) that can be run and that are accessible by users (humans, programs, or machines) of the computing environment 100.

The computing environment 100 includes a diagnostic engine core 104 according to some examples of the present disclosure. The diagnostic engine core 104 is lightweight in that the diagnostic engine core 104 implements certain basic functionalities to enable the performance of diagnostics in the computing environment 100. The diagnostic engine core 104 can be implemented using machine-readable instructions executable on a processing resource in the computing environment 100. Examples of basic functionalities of the diagnostic engine core 104 can include any or some combination of the following: accessing configuration information 106, dynamically loading extensible modules based on the configuration information 106, dynamically unloading extensible modules, establishing communication channels with the extensible modules, generating a representation of a diagnostic modules relationship of diagnostic modules based on the configuration information, receiving and processing diagnostic information from diagnostic modules, and sending diagnostic information to interface modules.

In some examples, the diagnostic engine core 104, the configuration information 106, and the extensible modules (e.g., 114A-114C, 116, 118A-118B) may be developed by different teams of programmers, possibly across different organizations. In examples where the diagnostic engine core 104 and the extensible modules are created by different teams, a common build container can be used to ensure compatibility between the diagnostic engine core 104 and the extensible modules. The common build container can include a specific version of a compiler, which can be used to compile program code of the diagnostic engine core 104 and the extensible modules (including diagnostic and interface modules). In other examples, instead of using a build container, a different development tool can be shared by multiple teams to build the diagnostic engine core 104 and the extensible modules that are compatible with one another.

Note that the diagnostic engine core 104 itself does not perform diagnostics and does not interact with any of various different types of output systems such an alert handling tool 120A, a UI system 120B, and a probe tool 122. As a result, the diagnostic engine core 104 does not have to be configured with program code for performing diagnostics or performing tasks of interface modules such as an observer module 116 and alert modules 118A and 118B. In other words, the program code for performing diagnostics and functions of the interface modules does not have to be statically compiled with the program code of the diagnostic engine core 104, which enhances the lightness and robustness of the diagnostic engine core 104.

The configuration information 106 includes information of interface modules (referred to as interface module information 108) and information of diagnostic modules (referred to as diagnostic module information 110). The configuration information 106 is stored in a memory 112 that is accessible by the diagnostic engine core 104.

The diagnostic module information 110 includes identifiers (e.g., names, addresses, uniform resource locators (URLs), uniform resource identifiers (URIs), or other identifiers) of diagnostic modules that are to be loaded by the diagnostic engine core 104. The diagnostic module information 110 can identify a subset of diagnostic modules from a larger collection of diagnostic modules.

The interface module information 108 includes identifiers of interface modules that are to be loaded by the diagnostic engine core 104. The interface module information 108 can identify a subset of interface modules from a larger collection of interface modules.

In the example of FIG. 1, the diagnostic engine core 104 can dynamically load, at runtime, diagnostic modules 114A, 114B, and 114C identified by the diagnostic module information 110. Although three diagnostic modules are depicted in the example of FIG. 1, in other examples, two diagnostic modules may be invoked, or more than three diagnostic modules may be invoked.

The diagnostic engine core 104 is also able to dynamically load, at runtime, interface modules identified by the interface module information 108. In the example of FIG. 1, the interface modules that are loaded include the observer module 116 and the alert modules 118A and 118B. Although two alert modules are depicted in the example of FIG. 1, the diagnostic engine core 104 can load a different quantity of alert modules in another example, such as just one alert module or more than two alert modules. Similarly, although just one observer module 116 is depicted in the example of FIG. 1, in other examples, a different quantity of observer modules may be loaded by the diagnostic engine core 104.

The diagnostic engine core 104 is also able to dynamically unload a diagnostic module or an interface module as the diagnostic module or interface module complete its operation. "Loading" an extensible module refers to retrieving machine-readable instructions of the extensible module (along with any related information) into a memory, such as the memory 112 or a different memory. Although loaded into the memory, the extensible module may not yet execute until triggered to execute, such as by the diagnostic engine core 104. "Unloading" an extensible module refers to removing machine-readable instructions of the extensible module (along with any related information) from the memory.

The ability to dynamically load selected extensible modules (including diagnostic and interface modules) from a larger collection of extensible modules allows for lightweight and efficient selection of which extensible modules are to be used for performing workloads associated with diagnostics. Also, dynamic loading of selected extensible modules leads to more efficient usage of the memory, since extensible modules that are not used would not have to consume the memory. Similarly, the ability to dynamically unload extensible modules reduces memory usage and frees up memory space in the memory for other information, such as machine-readable instructions of other programs.

In some cases, there may be hundreds of interface modules and thousands of diagnostic modules used by multiple teams of users in the computing environment 100. However, just a small fraction of the interface modules and diagnostic modules may be loaded in the memory at any given time.

Also, in some examples, the diagnostic engine core 104 can be implemented as an easy-to-deploy single executable object, since the diagnostic engine core 104 is lightweight. Additionally, as new diagnostics are defined or existing diagnostics are changed, the collection of diagnostic modules can be updated (e.g., by adding new diagnostic modules or replacing existing diagnostic modules) for invocation by the diagnostic engine core 104.

Use of the diagnostic engine core 104 and dynamically loadable extensible modules based on the configuration information 106 allows for declarative runtime (and not build time) configuration and composition of a diagnostic system (made up of the diagnostic engine core 104 and any loaded extensible modules) to perform target diagnostics. The configuration information 106 can be provided to the diagnostic engine core 104 while the diagnostic engine core 104 is running in the computing environment 100. This enhances flexibility since the diagnostic engine core 104 does not have to be pre-configured with information regarding what diagnostics to run when the diagnostic engine core 104 is built. Rather, the configuration information 106 can be supplied at runtime of the diagnostic engine core 104, and in fact, the configuration information 106 can be modified during runtime of the diagnostic engine core 104 to change what extensible modules to invoke.

The diagnostic modules 114A, 114B, and 114C when run perform respective diagnostic operations on the collection of services 102. A "diagnostic operation" can include one or more diagnostics. Although just one collection of services is shown in FIG. 1, it is noted that the diagnostic modules 114A, 114B, and 114C (or other diagnostic modules) may perform diagnostics of other collection(s) of services or of collection(s) of computing resources. In some examples, diagnostics can be performed of computing resources on which computing services are dependent for operations of the computing services.

In examples with multiple collections of services and/or resources to be diagnosed, multiple instances of the configuration information 106 (e.g., multiple configuration files) may be provided for the respective multiple collections of services and/or resources. Multiple diagnostic engine cores may be used for the respective collections of services and/or resources. Since each diagnostic engine core is lightweight, running multiple diagnostic engine cores would not overburden resources of the computing environment 100. The multiple instances of configuration information 106 may specify different collections of diagnostics to be run for the different services and/or resources.

The interface modules that are loaded by the diagnostic engine core 104 of FIG. 1 include the observer module 116 and the alert modules 118A and 118B, which can flexibly interact with any of various different types of output systems. One or more of such output systems may be provided by a party different from the operator of the computing environment 100. The alert modules 118A and 118B can interact with different output systems. For example, the alert module 118A can interact with the alert handling tool 120A. The alert handling tool 120A, such as a Slack diagnostic tool or another type of tool or service provided by a third party, can be used to perform any or some combination of the following: process fault alerts for determining the underlying cause of faults indicated by the fault alerts, log the fault alerts, provide an interface between the alert module 118A and another service, or any other alert handling actions.

The alert module 118B can interact (either directly or indirectly) with a user interface (UI) system 120B, which presents a UI to present information of any alerts received by the alert module 118B from the diagnostic engine core 104. In some examples, the UI presented by the UI system 120B includes a graphical user interface (GUI) to graphically present alert information, such as in the form of graph depicting metrics (e.g., latency, resource usage, data rate, etc.) over time or as a function of another variable, or a heatmap showing colors based on values of metrics. In other examples, the UI can present information in a different form, such as text form. An example of an indirect interaction involves the use of a backend system between the alert module 118B and the UI system 120B. Alerts are supplied by the alert module 118B to the backend system. The UI system 120B receives the information of the alerts from the backend system.

The observer module 116 can interact with the probe tool 122, such as a health probe used for evaluating the health of the collection of services 102 based on diagnostic information provided by the diagnostic modules 114A to 114C. For example, if the probe tool 122 can be a Kubernetes liveness probe, which evaluates the health of a Kubernetes pod with multiple containers. In other examples, other types of probe tools can be used for evaluating the health of computing services or resources in the computing environment 100.

The diagnostic modules 114A, 114B, and 114C can be executed in an execution order and according to dependencies as specified by the diagnostic module information 110 in the configuration information 106. For example, the diagnostic module information 110 can include scheduling indicators specifying which diagnostic module is to be executed before or after another diagnostic module. A relationship including the execution order and dependencies of diagnostic modules is generated by the diagnostic engine core 104 based on the configuration information 106. As a result, program code does not have to be written or compiled for the diagnostic engine core 104 to specify the relationship of the diagnostic modules.

An example of the diagnostic module information 110 identified as "DIAGNOSTICS INFORMATION" is set forth below. An "after" keyword is an example of a scheduling indicator that specifies that a particular diagnostic module is to be executed after another diagnostic module. In other examples, other keywords may be employed to indicate a scheduling dependency, i.e., whether a first collection of one or more diagnostic modules is to be executed before or after a second collection of one or more diagnostic modules.

Diagnostics Information

```
label: DIAG-1
    file: /opt/diagnostics/DIAG-A.so
    symbol: DIAG-A-factory
    parameters:
        aaa
        bbb
label: DIAG-2
    file: /opt/diagnostics/DIAG-A.so
    symbol: DIAG-A-factory
    after: DIAG-1
    parameters:
        ccc
        ddd
label: DIAG-3
    file: /opt/diagnostics/DIAG-B.so
    symbol: DIAG-B-factory
    after: DIAG-2.
    parameters:
        xxx
        yyy
        zzz.
```

In the example above, three diagnostic modules are identified: DIAG-1, DIAG-2, and DIAG-3. The example diagnostic module information 110 includes location information that identifies where the program code for the respective diagnostic module is located. For example, "file: /opt/diagnostics/DIAG-A.so" specifies a file system directory location where a shared object (named "DIAG-A.so") is accessible. A shared object is also referred to as a shared library object. Although examples discussed herein refer to .so shared objects, in other examples, other types of objects can be used to contain program code for a diagnostic module.

The diagnostic engine core 104 loads the DIAG-1 diagnostic module from DIAG-A.so by calling a function identified by a function name after the "symbol" keyword. In the example above, the function name (or symbol) of the diagnostic module based on DIAG-A.so is "DIAG-A-factory." The symbol implements an interface between the diagnostic engine core 104 and a respective diagnostic module.

The input parameters for the DIAG-1 diagnostic module are "aaa" and "bbb," as specified after the "parameters" keyword. The input parameters are used by the DIAG-1 diagnostic module when executed to perform a respective diagnostic of the DIAG-1 diagnostic module.

In the example above, it is assumed that the DIAG-2 diagnostic module is also based on the same shared object (DIAG-A.so), and is loaded when the diagnostic engine core 104 makes another call of the DIAG-A-factory symbol. The input parameters to the DIAG-2 diagnostic module are "ccc" and "ddd," which are different from the input parameters for the DIAG-1 diagnostic module. Thus, although both the DIAG-1 and DIAG-2 diagnostic modules are based on the same shared object (DIAG-A.so), they use different input parameters which causes different respective diagnostics to be performed. More generally, a symbol can be called multiple times to invoke multiple instances of the same diagnostic module. Each call of the symbol creates a new, distinct in-memory instance of the diagnostic module. Each instance of the diagnostic module may be configured with different input parameters. Additionally the instances of the diagnostic module may have their own unique dependencies. For example, two in-memory instances of a diagnostic module can depend on one another.

The example diagnostic module information 110 includes "after: DIAG-1" to indicate that the DIAG-2 diagnostic module is to be executed after the successful completion of the DIAG-1 diagnostic module. If DIAG-2 diagnostic module would not be executed if the DIAG-1 diagnostic module fails.

In addition, the example diagnostic module information 110 includes location information, "file: /opt/diagnostics/DIAG-B.so," to identify where a shared object (named "DIAG-A.so") for the DIAG-3 diagnostic module is located. The diagnostic engine core 104 calls the symbol "DIAG-B-factory" to create a new in-memory instance of the DIAG-3 diagnostic module from the shared object DIAG-B.so. The input parameters to the DIAG-3 diagnostic module are "xxx," "yyy," and "zzz." The example diagnostic module information 110 includes "after: DIAG-2" to indicate that the DIAG-3 diagnostic module is to be executed after successful completion of the DIAG-2 diagnostic module.

The shared objects may be digitally signed and can be checked by the diagnostic engine core 104 prior to loading the extensible modules to detect if the extensible modules have been tampered or otherwise have been modified.

In some examples, the diagnostic engine core 104 is able to generate, based on the diagnostic module information 110, a graph-based representation of the relationship of the diagnostic modules.

Figures 2, 3, 4:
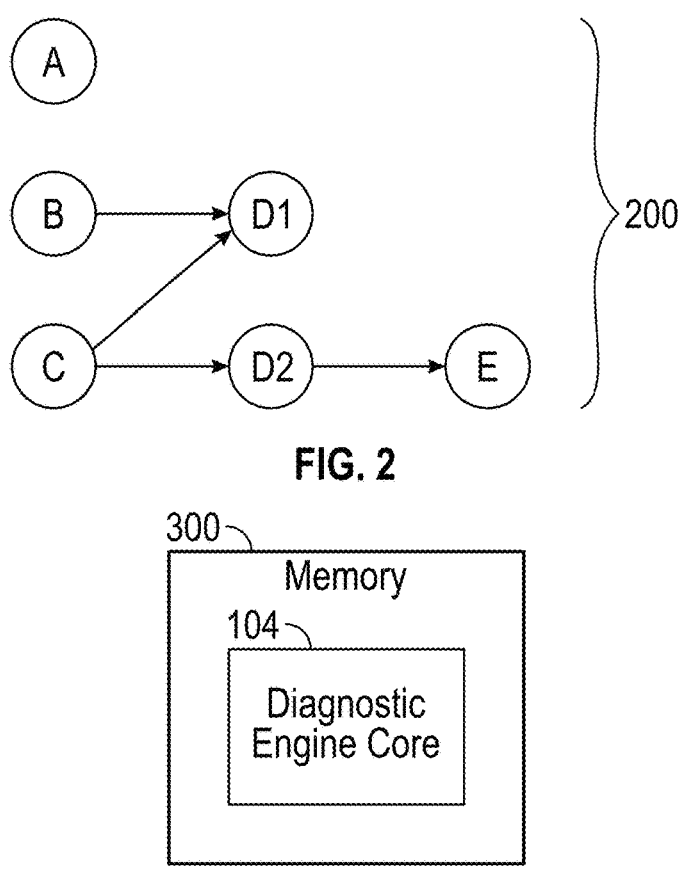
FIG. 2 is a graphical view of a graph-based representation of a relationship among diagnostic modules, according to some examples.
FIG. 3 to FIG. 5 are block diagrams of loading a diagnostic engine core, diagnostic modules, and interface modules to perform diagnostics, in accordance with some examples.

An example graph-based representation 200 is shown in FIG. 2, which includes nodes that represent diagnostic modules A, B, C, D1, D2, and E. Edges connecting the nodes specify the order in which the diagnostic modules represented by the nodes are to be executed. The graph-based representation 200 is a directed acyclic graph.

The graph-based representation 200 indicates that the diagnostic module A can be independently invoked and does not follow or precede any other diagnostic module. The graph-based representation 200 indicates that diagnostic module D1 follows diagnostic modules B and C, and that diagnostic module D2 follows diagnostic module C. Diagnostic modules D1 and D2 are different instantiations of the same diagnostic module program code (e.g., in the form of a shared object). The graph-based representation 200 indicates that diagnostic module E follows diagnostic module D2.

A group of diagnostic modules that are invoked together and run in an execution order and according to dependencies represented by a graph-based representation is referred to as a "run" of diagnostic modules. As a given diagnostic module in a run completes its execution, the given diagnostic module can provide a completion indication to the diagnostic engine core 104, which can then invoke the next diagnostic module(s) in the run. The "completion indication" can be in the form of a signal, a message, an information element, or any other indicator.

An example of the interface module information 108 identified as "INTERFACE INFORMATION" is set forth below.

Interface Information

```
label: INTF-1
file: /opt/interface/INTF-A.so
symbol: INTF-A-Factory
label: INTF-2
file: /opt/interface/INTF-A.so
symbol: INTF-B-Factory
```

In the example interface module information 108 above, two interface modules INTF-1 and INTF-2 are identified. The example interface module information 108 includes location information that identifies where the program code for the respective interface module is located. For example, "file: /opt/diagnostics/INTF-A.so" specifies a file system directory location where a shared object (named "INTF-A.so") is accessible. The diagnostic engine core 104 loads the INTF-1 interface module from INTF-A.so by calling a function identified by the symbol INTF-A-Factory. More specifically, calling the symbol creates an in-memory instance of the interface module. It is possible to call the symbol multiple times to create multiple in-memory instances of the interface module.

The location information, file: /opt/diagnostics/INTF-B.so" specifies a file system directory location where a shared object (named "INTF-B.so") is accessible. The diagnostic engine core 104 loads the INTF-2 interface module from INTF-B.so by calling a function identified by the symbol INTF-B-Factory.

Figure 5:
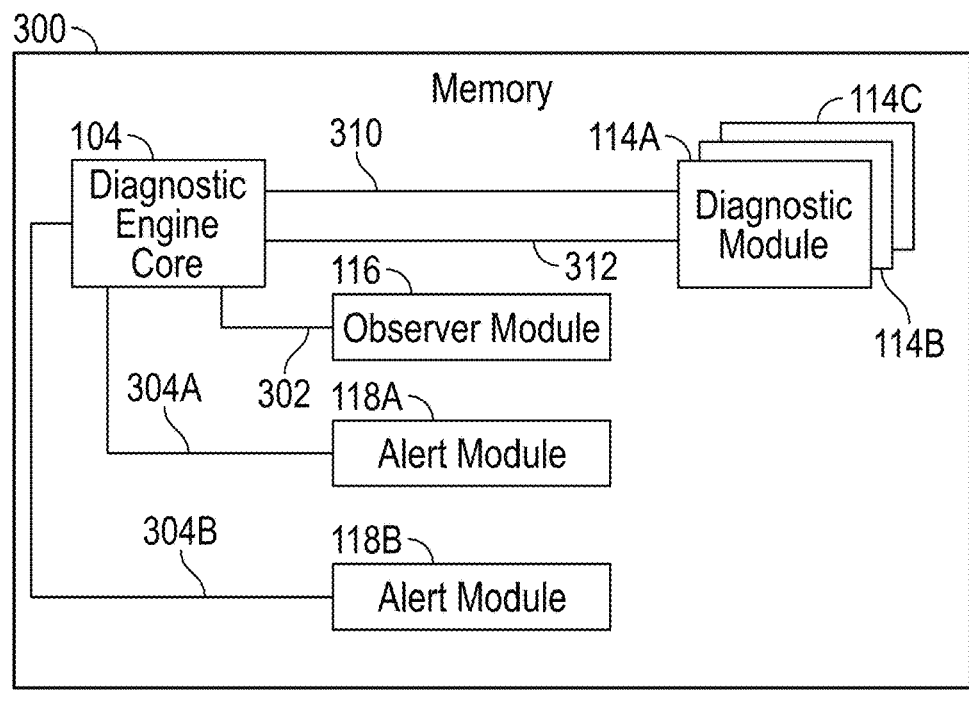

FIG. 3 to FIG. 5 show a sequence of states of a composable diagnostic system according to some examples, which includes the diagnostic engine core 104 and extensible modules. FIG. 3 an initial state when the diagnostic engine core 104 is first invoked. FIG. 3 shows program code of the diagnostic engine core 104 loaded into a memory 300 of the computing environment 100. At this time, extensible modules have not yet been loaded, so the memory 300 contains just the program code (and any associated information) of the diagnostic engine core 104. In FIG. 3, the program code of extensible modules have not yet been added to the memory 300, so that the amount of the memory 300 that is consumed for diagnostic purposes is minimal.

FIG. 4 shows a state of the composable diagnostic system after the diagnostic engine core 104 has dynamically loaded, based on the interface module information 108, some interface modules into the memory 300. The loaded interface modules include the observer module 116 and the alert modules 118A and 118B. In the state shown in FIG. 4, a greater extent of the memory 300 has been consumed for diagnostic purposes, since the memory 300 now stores the program code (and any associated information) of the diagnostic engine core 104, the observer module 116 and the alert modules 118A and 118B.

The diagnostic engine core 104 also sets up communication channels with the loaded interface modules. The communication channels include a communication channel 302 between the diagnostic engine core 104 and the observer module 116, a communication channel 304A between the diagnostic engine core 104 and the alert module 118A, and a communication channel 304B between the diagnostic engine core 104 and the alert module 118B.

A communication channel can be a memory-based communication channel, in which information shared between entities are passed through a shared memory region of the memory 300.

FIG. 5 shows a state of the composable diagnostic system after the diagnostic engine core 104 has further dynamically loaded the diagnostic modules 114A-114B, which causes program code of the diagnostic modules 114A-114B to be loaded into the memory 300. The diagnostic engine core 104 also sets up communication channels 310, 312 between the diagnostic engine core 104 and the diagnostic modules 114A-114B. The communication channels 302, 304A, 304B, 310, and 312 can exist within a single process executed in the computing environment 100. Note further that the diagnostic engine core 104, the interface modules, and the diagnostic modules also exist in the single process. As a result, communications over such channels are not inter-process communications or communications over a network, but rather occur through shared memory.

In some examples, the communication channel 310 is a synchronous communication channel, and the communication channel 312 is an asynchronous communication channel. The synchronous communication channel 310 is used to communicate synchronous events, such as diagnostic information provided by a diagnostic module upon completion of a diagnostic operation performed with respect to the collection of services 102 by the diagnostic module. The diagnostic information provided over the synchronous communication channel 310 can include both information regarding diagnostics that have passed as well as diagnostics that have failed.

On the other hand, the asynchronous communication channel 312 is used to communicate asynchronous events, such as a fail indication generated by a diagnostic module when a fault in the collection of services 102 is detected by the diagnostic module. The fail indication can be generated even before the diagnostic module has completed the diagnostic operation. The fail indication allows the diagnostic module to provide a notification of a fault to the diagnostic engine core 104 as quickly as possible so that actions can be taken to address the fault.

A fail indication can be in the form of a message, an information element, or any other indicator that a fault has been detected. The fail indication is considered asynchronous diagnostic information. The fail indication contains information indicating the type of fault, a component associated with the fault, a timestamp of the fault, and any other information that may be useful for determining a cause of the fault.

Fail indications received by the diagnostic engine core 104 over the asynchronous communication channel 312 from one or more diagnostic modules trigger the diagnostic engine core 104 to send respective alerts to the alert modules 304 over respective communication channels 304A and 304B. Similarly, diagnostic information received by the diagnostic engine core 104 over the synchronous communication channel 310 is sent by the diagnostic engine core 104 to the observer module 116.

In some examples, the probe tool 122 can send a request for diagnostic information of the collection of services 102 to the observer module 116, which in turn can forward the request to the diagnostic engine core 104. Based on this request, the diagnostic engine core 104 can respond with the diagnostic information once the execution of the diagnostic modules 114A-114C according to a graph-based representation of the relationship of diagnostic modules completes. The diagnostic engine core 104 can maintain cached diagnostic information, such as in a cache memory. The cached diagnostic information may be from a prior run of the diagnostic modules. Thus, if the observer module 116 requests diagnostic information, the diagnostic engine core 104 can respond to the observer module 116 with the cached diagnostic information even if the current run of diagnostic modules has not yet been completed.

As a diagnostic module completes its diagnostic operation, the diagnostic module sends diagnostic information (including any pass/fail indications and details of failures) over the synchronous communication channel 310 to the diagnostic engine core 104. If the diagnostic module detects a fault in the collection of services 102 in the diagnostic operation, the diagnostic module issues a fail indication to the diagnostic engine core 104 over the asynchronous communication channel 312. The fail indication triggers the diagnostic engine core 104 to send an alert to the alert modules 118A and 118B. The alert module 118A provides the alert (or information in the alert) to the alert handling tool 120A, and the alert module 118B provides the alert (or information in the alert) to the UI system 120B. The alert handling tool 120A can process the alert (information) and take action in response to the alert, including fault isolation, a remediation action to fix the faults, or another action. Alternatively or additionally, the alert handling tool 120A can perform other actions as discussed further above. The UI system 120B can present the alert (information) in a UI for viewing by an administrator or another user, for example.

When a run of the diagnostic modules 114A to 114C has completed, and the diagnostic modules 114A to 114C have provided diagnostic information to the diagnostic engine core 104, the diagnostic engine core 104 sends the complete set of diagnostic information (including an aggregation of diagnostic information provided by all of the diagnostic modules 114A to 114C) to the observer module 116. The observer module 116 can make a determination of the health of the collection of services 102 based on the complete set of diagnostic information. In some examples, the observer module 116 can send an indication of whether the health of the collection of services 102 is "OK" or not when requested (polled) by the probe tool 122. The "OK" indication can include a first numeric value, while a "NOT OK" indication can include a second numeric value, for example. In other examples, the observer module 116 can send the complete set of diagnostic information to the probe tool 122, for analysis by the probe tool 122.

In some examples, the interface modules (including the observer module 116 and the alert modules 118A and 118B) can use publish-subscribe communications, in which an interface module can subscribe with the diagnostic engine core 104 for notification of certain events, and upon the occurrence of those events, the diagnostic engine core 104 can send information of the events to the interface module that subscribed to the events.

Figure 6:
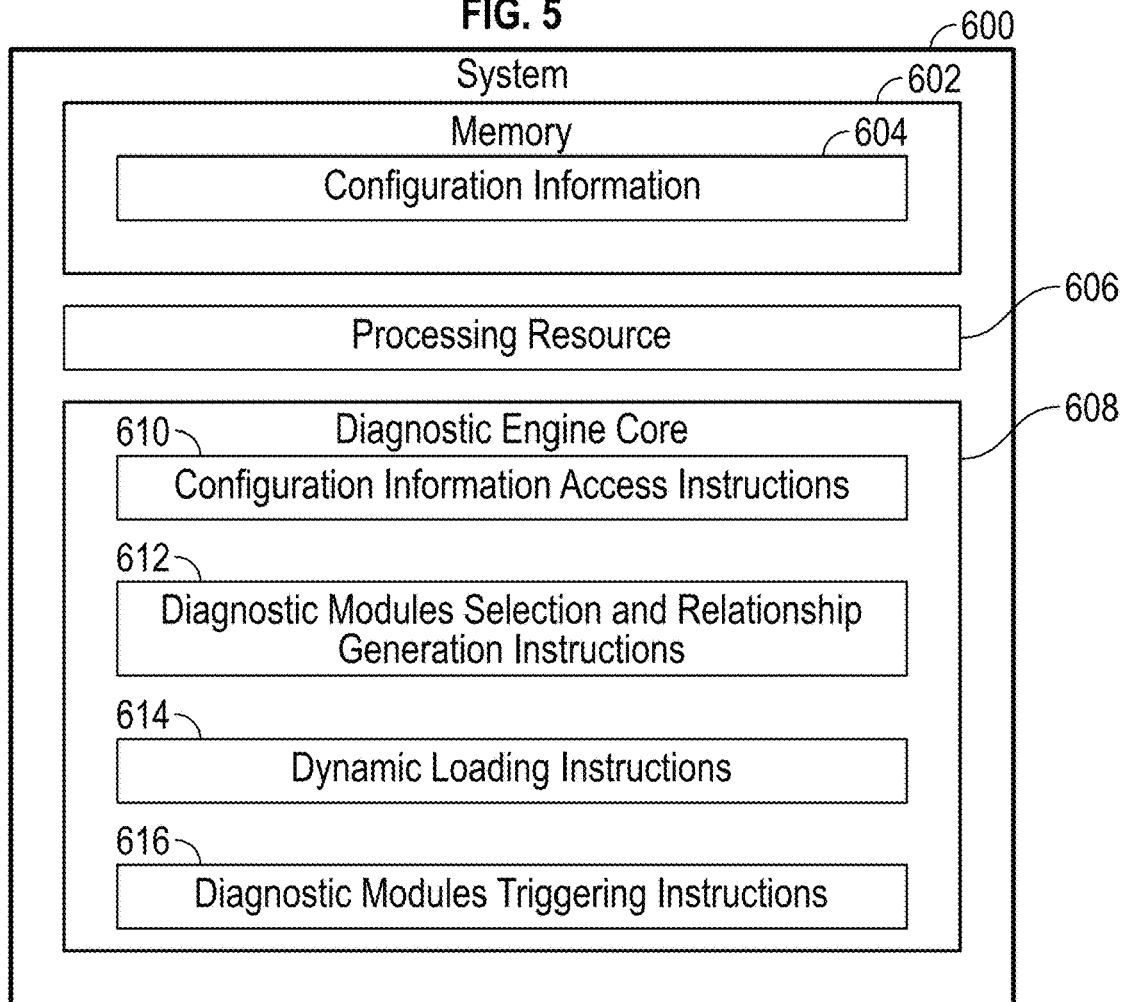
FIG. 6 is a block diagram of a system according to some examples.

FIG. 6 is a block diagram of a system 600, which may be implemented with one or more computers. The system 600 includes a memory 602 to store configuration information 604 specifying diagnostics to be performed on a collection of compute elements, such as one or more computing services and/or one or more computing resources. An example of the configuration information 604 is the configuration information 106 of FIG. 1.

The system 600 includes a processing resource 606, which includes one or more hardware processors. A hardware processor can include a microprocessor, a core of a multi-core microprocessor, a microcontroller, a programmable integrated circuit, a programmable gate array, or another hardware processing circuit.

The system 600 includes a diagnostic engine core 608 including machine-readable instructions executable on the processing resource 606 to perform various tasks. The machine-readable instructions of the diagnostic engine core 608 may be stored in a storage medium and loaded into memory 602 for execution. The machine-readable instructions of the diagnostic engine core 608 include configuration information access instructions 610 to access the configuration information 604.

The machine-readable instructions of the diagnostic engine core 608 include diagnostic modules selection and relationship generation instructions 612 to, based on the configuration information 604, select diagnostic modules from a plurality of diagnostic modules, and generate a representation of the relationship of the selected diagnostic modules. In some examples, the configuration information 604 includes scheduling indicators that define the execution order of the diagnostic modules. The selected diagnostic modules identified in the configuration information 604 can be a subset of a larger collection of diagnostic modules used across an organization or across multiple organizations.

The machine-readable instructions of the diagnostic engine core 608 include dynamic loading instructions 614 to dynamically load the selected diagnostic modules at runtime of the diagnostic engine core 608. The selected diagnostic modules are extensible modules with diagnostic functionalities that can be dynamically added to a composable diagnostic system at runtime, so that the program code of the selected diagnostic modules do not have to be statically compiled with the program code of the diagnostic engine core 608.

The machine-readable instructions of the diagnostic engine core 608 include diagnostic modules triggering instructions 616 to, after the dynamic loading, trigger execution of the selected diagnostic modules in the execution order and according to dependencies specified in the representation of the relationship of the selected diagnostic modules, the selected diagnostic modules when executed performing the diagnostics on the collection of compute elements.

In some examples, the generating of the representation of the relationship includes generating a graph-based representation of the relationship, the graph-based representation including a plurality of nodes representing respective diagnostic modules of the selected diagnostic modules. An edge connecting a first node to a second node of the plurality of nodes specifies that a first diagnostic module represented by the first node is to execute before a second diagnostic module represented by the second node.

In some examples, the diagnostic engine core 608 is executable on the processing resource 606 to traverse the graph-based representation for triggering the execution of the selected diagnostic modules.

In some examples, communication channels are set up between the selected diagnostic modules and the diagnostic engine core 608. The diagnostic engine core 608 is executable on the processing resource 606 to receive diagnostic information relating to performance of the diagnostics by the selected diagnostic modules over the communication channels.

In some examples, the diagnostic engine core 608 is executable on the processing resource 606 to load an alert interface module based on the configuration information 604, and send the diagnostic information to the alert interface module for providing to an output system.

In some examples, the diagnostic engine core 608 is executable on the processing resource 606 to load a plurality of interface modules based on the configuration information 604, and send the diagnostic information to the plurality of interface modules for provision to different types of output systems (e.g., 116 and 118A-118B in FIG. 1).

In some examples, a first interface module of the plurality of interface modules receives a full set of diagnostic information relating to the execution of the selected diagnostic modules, and a second interface module of the plurality of interface modules receives an asynchronous alert of a fault detected by a diagnostic module of the selected diagnostic modules.

In some examples, the plurality of interface modules can include shared library objects.

In some examples, the diagnostic engine core 608 is executable on the processing resource 606 to dynamically unload a diagnostic module of the selected diagnostic modules after the diagnostic module completes execution.

In some examples, the program code of the selected diagnostic modules is not compiled as part of the machine-readable instructions of the diagnostic engine core.

In some examples, an update of the configuration information changes which diagnostic modules are to be executed by the diagnostic engine core 608.

In some examples, the loading of the selected diagnostic modules at runtime of the diagnostic engine core 608 is performed without performing compilation of the selected diagnostic modules and the diagnostic engine core 608.

In some examples, the diagnostic engine core 608 and the plurality of diagnostic modules are developed based on a build container containing a compiler.

Figure 7:
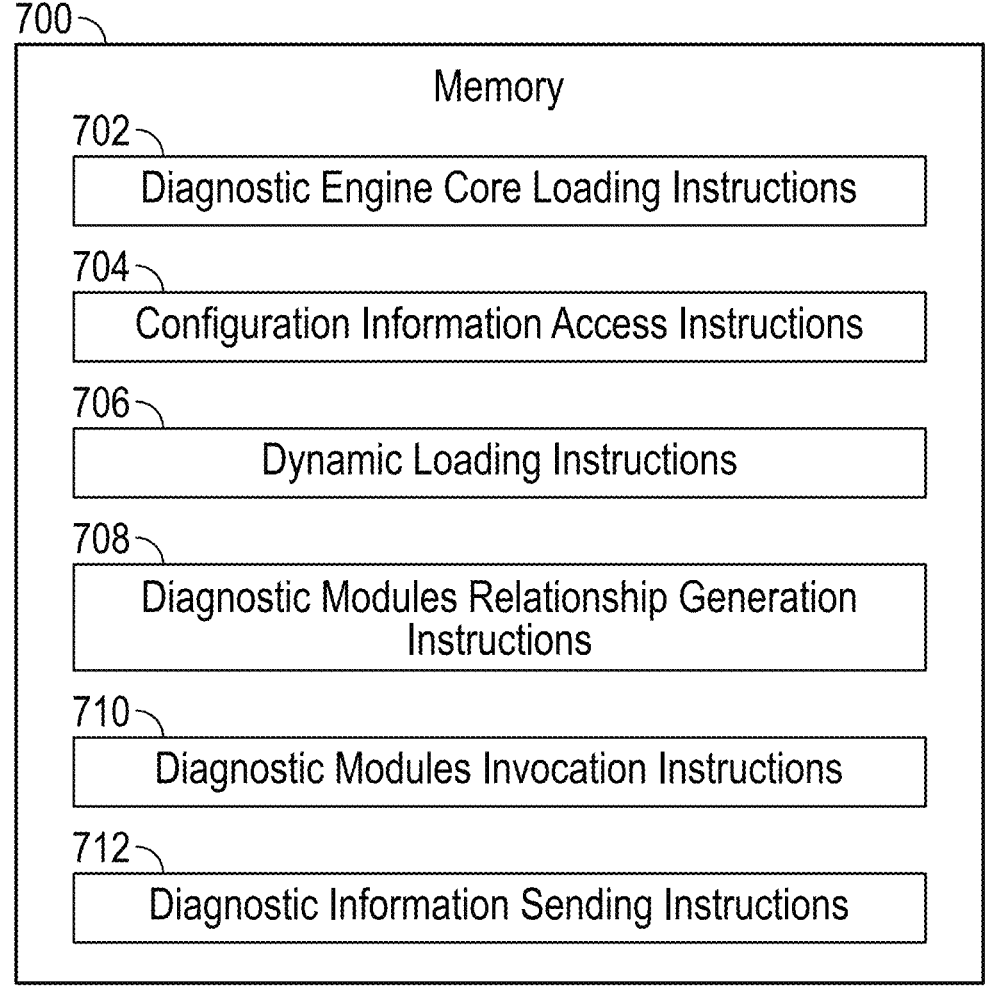
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a system to perform various tasks. The machine-readable instructions include diagnostic engine core loading instructions 702 to load a diagnostic engine core into a memory of the system.

The machine-readable instructions include configuration information access instructions 704 to access, by the diagnostic engine core, configuration information including information of diagnostic modules and an interface module. The configuration information can identify the diagnostic modules and the interface module from a larger collection of diagnostic modules and interface modules.

The machine-readable instructions include dynamic loading instructions 706 to, based on the configuration information, dynamically load, by the diagnostic engine core, the interface module and the diagnostic modules into the memory. The dynamic loading of the interface module and the diagnostic modules is performed at runtime of the diagnostic engine core.

The machine-readable instructions include diagnostic modules relationship generation instructions 708 to generate, by the diagnostic engine core, a representation of a relationship of the diagnostic modules based on the configuration information. The diagnostic engine core can generate a graph-based representation of the relationship using scheduling indicators in the configuration information.

The machine-readable instructions include diagnostic modules invocation instructions 710 to invoke, by the diagnostic engine core, the diagnostic modules according to an execution order and dependencies specified by the representation of the relationship. The invoked diagnostic modules perform diagnostics of a collection of compute elements.

The machine-readable instructions include diagnostic information sending instructions 712 to send, by the diagnostic engine core, diagnostic information produced by a diagnostic module of the diagnostic modules to the interface module for provision to an output system that handles the diagnostic information. For example, the output system can process, store, or display results of the diagnostics performed by the diagnostic modules.

FIG. 8 is a flow diagram of a process 800 according to some examples of the present disclosure. The process 800 can be performed in a computing environment (e.g., 100 in FIG. 1).

The process 800 includes loading (at 802) a diagnostic engine core for performing diagnostics on a collection of compute elements. The diagnostic engine core is loaded into a memory for execution.

The process 800 includes accessing (at 804), by the diagnostic engine core, configuration information including information of diagnostic modules and an interface module, where the configuration information includes scheduling indicators of an execution order of the diagnostic modules. For example, a scheduling indicator can include a specified keyword in the configuration information.

The process 800 includes dynamically loading (at 806), by the diagnostic engine core based on the configuration information, the interface module and the diagnostic modules. The interface module and the diagnostic modules are loaded into the memory (as part of the same process) for execution.

The process 800 includes generating (at 808), by the diagnostic engine core, a representation of a relationship of the diagnostic modules based on the scheduling indicators in the configuration information. The representation is a graph-based representation of the relationship, including the execution order and the dependencies of the diagnostic modules.

The process 800 includes invoking (at 810), by the diagnostic engine core, the diagnostic modules according to the execution order and the dependencies, the diagnostic modules to perform the diagnostics of the collection of compute elements.

The process 800 includes sending (at 812), by the diagnostic engine core, diagnostic information produced by a diagnostic module of the diagnostic modules to the interface module for provision to an output system that handles the diagnostic information.

A memory can be implemented using one or more memory devices, such as dynamic random access memory (DRAM) devices, static random access memory (SRAM) devices, flash memory devices, or other types of memory devices.

A storage medium (e.g., 700 in FIG. 7) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a memory to store configuration information specifying diagnostics to be performed on a collection of compute elements, the configuration information comprising identifiers of diagnostic modules and an identifier of an interface module;
a processing resource;
a diagnostic engine core comprising machine-readable instructions executable on the processing resource to:
access the configuration information;
based on the identifier of the interface module in the configuration information, dynamically load at runtime of the diagnostic engine core the interface module into the memory;
select the diagnostic modules from a plurality of diagnostic modules based on the identifiers of the diagnostic modules in the configuration information, and generate a representation of a relationship of the selected diagnostic modules;
dynamically load the selected diagnostic modules at the runtime of the diagnostic engine core into the memory;
after the loading of the interface module and the selected diagnostic modules, trigger execution by the processing resource of the selected diagnostic modules in an execution order and according to dependencies specified in the representation of the relationship of the selected diagnostic modules, the selected diagnostic modules when executed performing the diagnostics on the collection of compute elements; and
send, from the diagnostic engine core to the interface module, diagnostic information from the selected diagnostic modules for evaluation of the diagnostic information by an output system connected to the interface module.

2. The system of claim 1, wherein the generating of the representation of the relationship comprises generating a graph-based representation of the relationship, the graph-based representation comprising a plurality of nodes representing respective diagnostic modules of the selected diagnostic modules.

3. The system of claim 2, wherein an edge connecting a first node to a second node of the plurality of nodes specifies that a first diagnostic module represented by the first node is to execute before a second diagnostic module represented by the second node.

4. The system of claim 2, wherein the diagnostic engine core is executable on the processing resource to traverse the graph-based representation for triggering the execution of the selected diagnostic modules.

5. The system of claim 1, wherein the diagnostic engine core is executable on the processing resource to:
set up communication channels between the selected diagnostic modules and the diagnostic engine core; and receive the diagnostic information relating to performance of the diagnostics by the selected diagnostic modules over the communication channels.

6. The system of claim 5, wherein the interface module comprises an alert module to interact with an alert handling tool that processes a fault alert in the diagnostic information.

7. The system of claim 5, wherein the configuration information comprises identifiers of a plurality of interface modules, and the diagnostic engine core is executable on the processing resource to:
load the plurality of interface modules based on the identifiers of the plurality of interface modules in the configuration information.

8. The system of claim 7, wherein a first interface module of the plurality of interface modules is to receive a full set of diagnostic information relating to the execution of the selected diagnostic modules, and
wherein a second interface module of the plurality of interface modules is to receive an asynchronous alert of a fault detected by a diagnostic module of the selected diagnostic modules.

9. The system of claim 8, wherein the plurality of interface modules comprise shared objects.

10. The system of claim 1, wherein the diagnostic engine core is executable on the processing resource to:
dynamically unload a diagnostic module of the selected diagnostic modules after the diagnostic module completes execution.

11. The system of claim 1, wherein program code of the selected diagnostic modules is not compiled as part of the machine-readable instructions of the diagnostic engine core.

12. The system of claim 1, wherein an update of the configuration information changes which diagnostic modules are to be executed by the diagnostic engine core.

13. The system of claim 1, wherein the loading of the selected diagnostic modules at runtime of the diagnostic engine core is performed without performing compilation of the selected diagnostic modules and the diagnostic engine core.

14. The system of claim 1, wherein the diagnostic engine core and the plurality of diagnostic modules are developed based on a build container containing a compiler.

15. A non-transitory machine-readable storage medium comprising instructions that upon execution cause a system to:
load a diagnostic engine core;
access, by the diagnostic engine core, configuration information comprising identifiers of diagnostic modules and an identifier of an interface module;
based on the identifier of the interface module in the configuration information, dynamically load, at runtime of the diagnostic engine core, the interface module into a memory;
select, by the diagnostic engine core, the diagnostic modules from a plurality of diagnostic modules based on the identifiers of the diagnostic modules in the configuration information;
generate, by the diagnostic engine core, a representation of a relationship of the selected diagnostic modules;
dynamically load, by the diagnostic engine core, the selected diagnostic modules at the runtime of the diagnostic engine core into the memory;
after the loading of the interface module and the selected diagnostic modules, trigger execution of the selected diagnostic modules in an execution order and according to dependencies specified in the representation of the relationship of the selected diagnostic modules, the selected diagnostic modules when executed performing diagnostics on a collection of compute elements; and send, by the diagnostic engine core to the interface module, diagnostic information from the selected diagnostic modules for evaluation of the diagnostic information by an output system connected to the interface module.

16. The non-transitory machine-readable storage medium of claim 15, wherein the configuration information comprises indicators for specifying the execution order, and wherein the generating of the representation comprises generating a graph-based representation of the relationship.

17. The non-transitory machine-readable storage medium of claim 15, wherein program code of the selected diagnostic modules and the interface module is not compiled into the diagnostic engine core.

18. The non-transitory machine-readable storage medium of claim 15, wherein the instructions upon execution cause the system to:

dynamically unload a given diagnostic module of the selected diagnostic modules as a diagnostic operation of the given diagnostic module completes.

19. A method comprising:

for performing diagnostics on a collection of compute elements, loading a diagnostic engine core;

accessing, by the diagnostic engine core, configuration information comprising identifiers of diagnostic modules and an identifier of an interface module, wherein the configuration information comprises scheduling indicators of an execution order of the diagnostic modules;

based on the identifier of the interface module in the configuration information, dynamically loading, at runtime of the diagnostic engine core, the interface module into a memory;

selecting, by the diagnostic engine core, the diagnostic modules from a plurality of diagnostic modules based on the identifiers of the diagnostic modules in the configuration information;

generating, by the diagnostic engine core, a representation of a relationship of the selected diagnostic modules based on the scheduling indicators in the configuration information, the relationship comprising the execution order and dependencies of the selected diagnostic modules;

dynamically loading, by the diagnostic engine core, the selected diagnostic modules at the runtime of the diagnostic engine core into the memory;

after the loading of the interface module and the selected diagnostic modules, triggering execution of the selected diagnostic modules in the execution order and according to the dependencies specified in the representation, the selected diagnostic modules when executed performing the diagnostics on the collection of compute elements; and sending, by the diagnostic engine core to the interface module, diagnostic information from the selected diagnostic modules for evaluation of the diagnostic information by an output system connected to the interface module.

20. The method of claim 19, further comprising:

based on a modification of the configuration information, dynamically loading, by the diagnostic engine core, different diagnostic modules to perform different diagnostics on the collection of compute elements.

* * * * *